US012595876B2

(12) United States Patent
Wu et al.

(10) Patent No.: US 12,595,876 B2
(45) Date of Patent: Apr. 7, 2026

(54) SIX-AXIS AGILE SHOOTING DEVICE

(71) Applicant: Intelligent Eyes Automation Technology (Guangzhou) Co., Ltd., Guangzhou (CN)

(72) Inventors: Kai Wu, Guangzhou (CN); Junyong Zhu, Guangzhou (CN); Guosen Tang, Guangzhou (CN); Wencai He, Guangzhou (CN)

(73) Assignee: Intelligent Eyes Automation Technology (Guangzhou) Co., Ltd., Guangzhou (CN)

( * ) Notice: Subject to any disclaimer, the term of this patent is extended or adjusted under 35 U.S.C. 154(b) by 194 days.

(21) Appl. No.: 18/648,496

(22) Filed: Apr. 29, 2024

(65) Prior Publication Data

US 2024/0418309 A1 Dec. 19, 2024

(30) Foreign Application Priority Data

Jun. 16, 2023 (CN) .......................... 202321547250.8

(51) Int. Cl.
 *F16M 11/18* (2006.01)
 *G03B 17/56* (2021.01)
(52) U.S. Cl.
 CPC .................................. *F16M 11/18* (2013.01)

(58) Field of Classification Search
 CPC .............................. F16M 11/10; G03B 17/561
 See application file for complete search history.

(56) References Cited

FOREIGN PATENT DOCUMENTS

CN 202975814 U * 6/2013

* cited by examiner

*Primary Examiner* — Minh Q Phan

(57) ABSTRACT

A six-axis agile shooting device includes a base assembly, shooting assemblies, and six motion assemblies, a linear directional axis motion assembly is configured to drive a flipping directional axis motion assembly to move, the flipping directional axis motion assembly is configured to drive an infinite rotating motion assembly to flip, the infinite rotating motion assembly includes rotating platform assemblies provided with shooting workstations correspondingly, a gantry is fixed to the base assembly, a linear lead screw axis motion assembly is connected to a lead screw lifting axis motion assembly and configured to drive the lead screw lifting axis motion assembly to move, the lead screw lifting axis motion assembly is connected to a rotating axis motion assembly and configured to drive the rotating axis motion assembly to move, and the rotating axis motion assembly is connected to shooting assemblies and configured to drive the shooting assemblies to flip and shoot.

10 Claims, 5 Drawing Sheets

SIX-AXIS AGILE SHOOTING DEVICE

TECHNICAL FIELD

The disclosure relates to the field of automation, and more particularly to a six-axis agile shooting device.

BACKGROUND

At present, in processes of automated production lines, when operating on multiple surfaces of products or workpieces, it is necessary to rotate or flip the products or the workpieces and thus flipping mechanisms and rotating mechanisms should be equipped correspondingly. Multiple workstations are disposed on the flipping mechanisms, and the flipping mechanisms drive the workstations to flip simultaneously. The rotating mechanisms can drive each workstation to rotate independently, realizing a purpose of a free 360-degree rotation of the products or the workpieces on the workstations, and thus the products or the workpieces can be inspected, cleaned or measured from multiple angles.

A patent document with the application number of CN201210508846.7 (corresponding to the publication number of CN103852959A) discloses a triaxial gyroscope stabilizing device, which belongs to the technical field of special equipment mainly used in the earlier shooting stage of the film-television industry. As the triaxial gyroscope stabilizing device is proper in size, the triaxial gyroscope stabilizing device can bear multiple kinds of heavy equipment. In the current film-television industry, the stability of earlier shooting is the primary link of shooting, and in order to obtain more accurate and stable pictures, a cameraman needs to use a lot of stabilizing devices to complete shooting. Particularly under the special shooting environments, such as helicopters at high altitude and vehicles running at high-speed etc., damping devices are needed. Due to the multi-layer structural design, the triaxial gyroscope stabilizing device effectively achieves aims of automatic keeping of shooting stability and balance, can bear multiple kinds of different equipment after practice, achieves multiple functions and high efficiency, reduces shooting complexity, and improves accuracy.

The aforementioned patent document, in conjunction with the related art, reveals below problems of shooting devices in the related art: structures of the shooting devices in the related art applied in mobile-phone detecting has poor and insufficient flexibility, and cannot meet requirements of shooting from multiple angles.

SUMMARY

In order to overcome shortcomings of the related art, one of purposes of the disclosure is to provide a six-axis agile shooting device to solve problems of poor flexibility and lack of agility.

The one purpose of the disclosure is achieved through below technical solutions.

A six-axis agile shooting device includes a base assembly and multiple shooting assemblies.

The six-axis agile shooting device further includes a first linear directional axis motion assembly (i.e., linear directional axis motion assembly) disposed on the base assembly.

The six-axis agile shooting device further includes a second flipping directional axis motion assembly (i.e., flipping directional axis motion assembly), and the first linear directional axis motion assembly is configured to drive the second flipping directional axis motion assembly to move forward and backward.

The six-axis agile shooting device further includes a third infinite rotating motion assembly (i.e., infinite rotating motion assembly), the second flipping directional axis motion assembly is configured to drive the third infinite rotating motion assembly to flip, the third infinite rotating motion assembly includes multiple rotating platform assemblies, and each rotating platform assembly is provided with a shooting workstation correspondingly.

The six-axis agile shooting device further includes a gantry and a fourth linear lead axis screw motion assembly (i.e., linear lead screw axis motion assembly), the gantry is fixed to the base assembly, and fixedly connected to the fourth linear lead screw axis motion assembly.

The six-axis agile shooting device further includes a fifth lead screw lifting axis motion assembly (i.e., lead screw lifting axis motion assembly) fixedly connected to the fourth linear lead screw axis motion assembly, and the fourth linear lead screw axis motion assembly is configured to drive the fifth lead screw lifting axis motion assembly to move back and forth.

The six-axis agile shooting device further includes a sixth rotating axis motion assembly (i.e., rotating axis motion assembly) fixedly connected to the fifth lead screw lifting axis motion assembly, the fifth lead screw lifting axis motion assembly is configured to drive the sixth rotating axis motion assembly to move up and down, and the sixth rotating axis motion assembly is fixedly connected to the multiple shooting assemblies and configured to drive the multiple shooting assemblies to flip and shoot.

In an embodiment, the first linear directional axis motion assembly includes a first driving component (i.e., driving component) and a first lead screw (i.e., lead screw), the first driving component is fixedly connected to the first lead screw and configured to drive the first lead screw to rotate, and the first lead screw is threadedly connected to the second flipping directional axis motion assembly.

In an embodiment, a lower part of the second flipping directional axis motion assembly is provided with a slide assembly for guidance.

In an embodiment, each rotating platform assembly includes a hollow rotating platform and a 90-degree angle device (i.e., changing a direction in units of 90 degree), and the hollow rotating platform is installed on the 90-degree angle device.

In an embodiment, adjacent two of the multiple rotating platform assemblies are connected to each other by a coupling.

In an embodiment, the fourth linear lead screw axis motion assembly includes a fourth driving component (i.e., driving component) and a connecting rod, and the fourth driving component is fixedly connected to the connecting rod, and configured to drive the connecting rod to move.

In an embodiment, the fifth lead screw lifting axis motion assembly includes a fifth driving component (i.e., driving component), a belt pulley and a lift lead screw, and the fifth driving component is configured to drive the lift lead screw to rotate by the belt pulley.

In an embodiment, the sixth rotating axis motion assembly includes a lifting platform, and the lifting platform is slidably installed on the gantry.

In an embodiment, the sixth rotating axis motion assembly further includes a sixth driving component (i.e., driving component) and a connecting shaft assembly, and the sixth driving component is configured to drive the connecting shaft assembly to rotate.

In an embodiment, the connecting shaft assembly includes connecting shafts and couplings.

Compared with the related art, beneficial effects of the disclosure are below.

The first linear directional axis motion assembly is installed on the base assembly, the first linear directional axis motion assembly is configured to drive the second flipping directional axis motion assembly to move forward and backward, the second flipping directional axis motion assembly is configured to drive the third infinite rotating motion assembly to flip, the third infinite rotating motion assembly includes the rotating platform assemblies, and each rotating platform assembly is provided with the shooting workstation correspondingly, the gantry is fixed to the base assembly, and fixedly connected to the fourth linear lead screw axis motion assembly, the fourth linear lead screw axis motion assembly is fixedly connected to the fifth lead screw lifting axis motion assembly and configured to drive the fifth lead screw lifting axis motion assembly to move back and forth, the fifth lead screw lifting axis motion assembly is fixedly connected to the sixth rotating axis motion assembly, and configured to drive the sixth rotating axis motion assembly to move up and down, and the sixth rotating axis motion assembly is fixedly connected to the shooting assemblies and configured to drive the shooting assemblies to flip and shoot. Six motion assemblies are used for linkage shootings from multiple angles, solving the problems of poor flexibility and lack of mobility.

Above description is only an overview of the technical solutions of the disclosure, in order to be able to more clearly understand technical means of the disclosure to implement in accordance with specification contents, and in order to make above and other purposes, features and advantages of the disclosure can be more apparent and easier to understand, an embodiment is specially cited with accompanying drawings, a detailed description is as follows.

Figure 1:
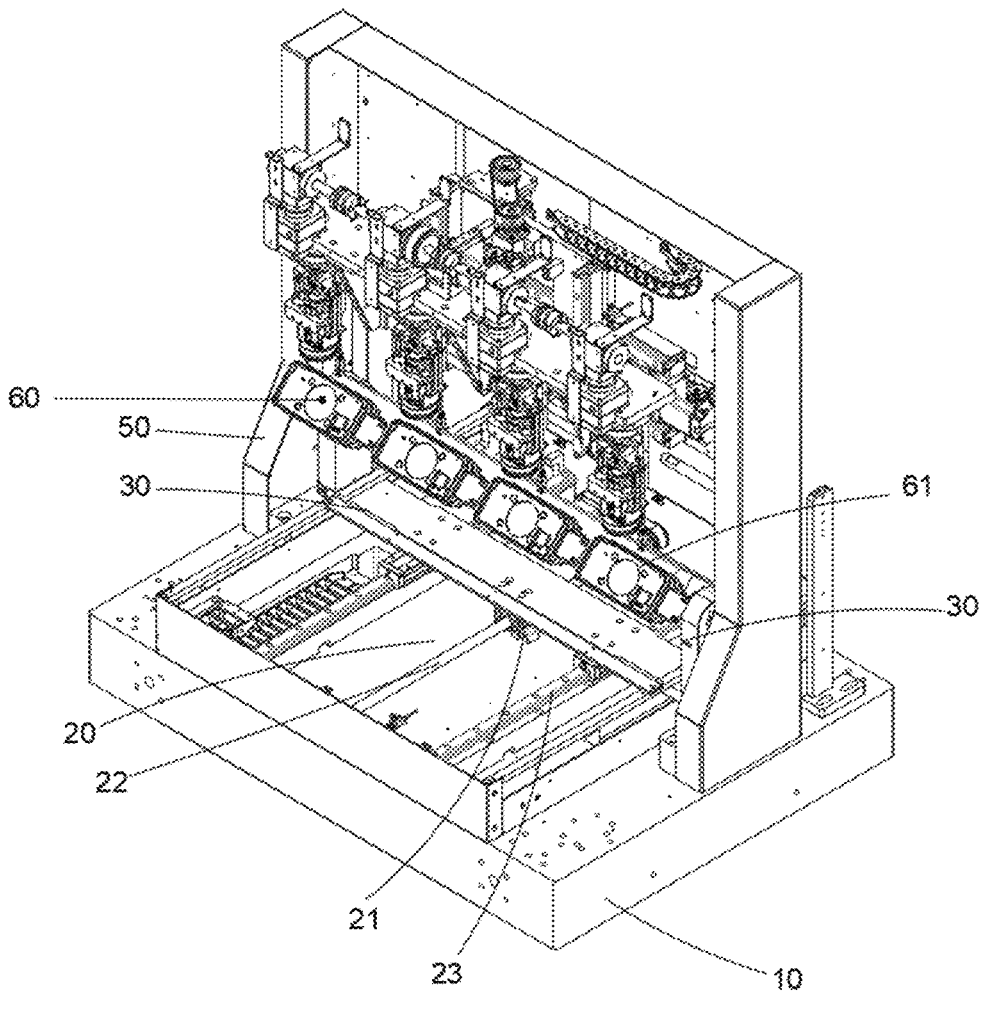
FIG. 1 illustrates a first schematic stereogram of a six-axis agile shooting device in an embodiment.

Description of reference numerals: 10: base assembly; 20: first linear directional axis motion assembly; 21: first driving component; 22: first lead screw; 23: slide assembly; 30: second flipping directional axis motion assembly; 31: second bracket; 32: second driving component; 50: gantry; 60: third infinite rotating motion assembly; 61: rotating platform assembly; 62: shooting workstation; 63: third driving component; 64: third transmission component; 65: third bracket; 66: 90-degree angle device; 67: coupling; 68: hollow rotating platform; 69: transmission shaft; 70: fourth linear lead screw axis motion assembly; 71: fourth driving component; 72: connecting rod; 80: fifth lead screw lifting axis motion assembly; 81: fifth driving component; 811: belt pulley; 812: lift lead screw; 90: sixth rotating axis motion assembly; 901: lifting platform; 91: sixth driving component; 92: connecting shaft assembly; 921: connecting shaft; 922: coupling; 200: shooting assembly.

DETAILED DESCRIPTION OF EMBODIMENTS

The disclosure is further described below through a specific embodiment with accompanying drawings, and it should be noted that, when no conflicts are present, any embodiment or technical feature described below can be combined to form a new embodiment.

It should be noted that when an assembly is "fixed" to another assembly, the assembly may be directly on the another assembly or there might be a centered assembly disposed between the assembly and the another assembly. When an assembly is "connected" to another assembly, the assembly may be directly connected to the another assembly, or there might be a centered assembly disposed between the assembly and the another assembly. When an assembly is "disposed" on another assembly, the assembly may be disposed directly on the another assembly, or there might be a centered assembly disposed between the assembly and the another assembly. Terms, such as "vertical", "horizontal", "left" and "right" etc., are for a purpose of illustrations only.

Unless otherwise defined, all technical and scientific terms used in the disclosure have same meanings as commonly understood by those skilled in the art. Terms in the specification are for describing a specific embodiment only, and not intended to limit the disclosure. Terms such as "and/or" include any combination of one or multiple relevant listed items.

Figure 2:
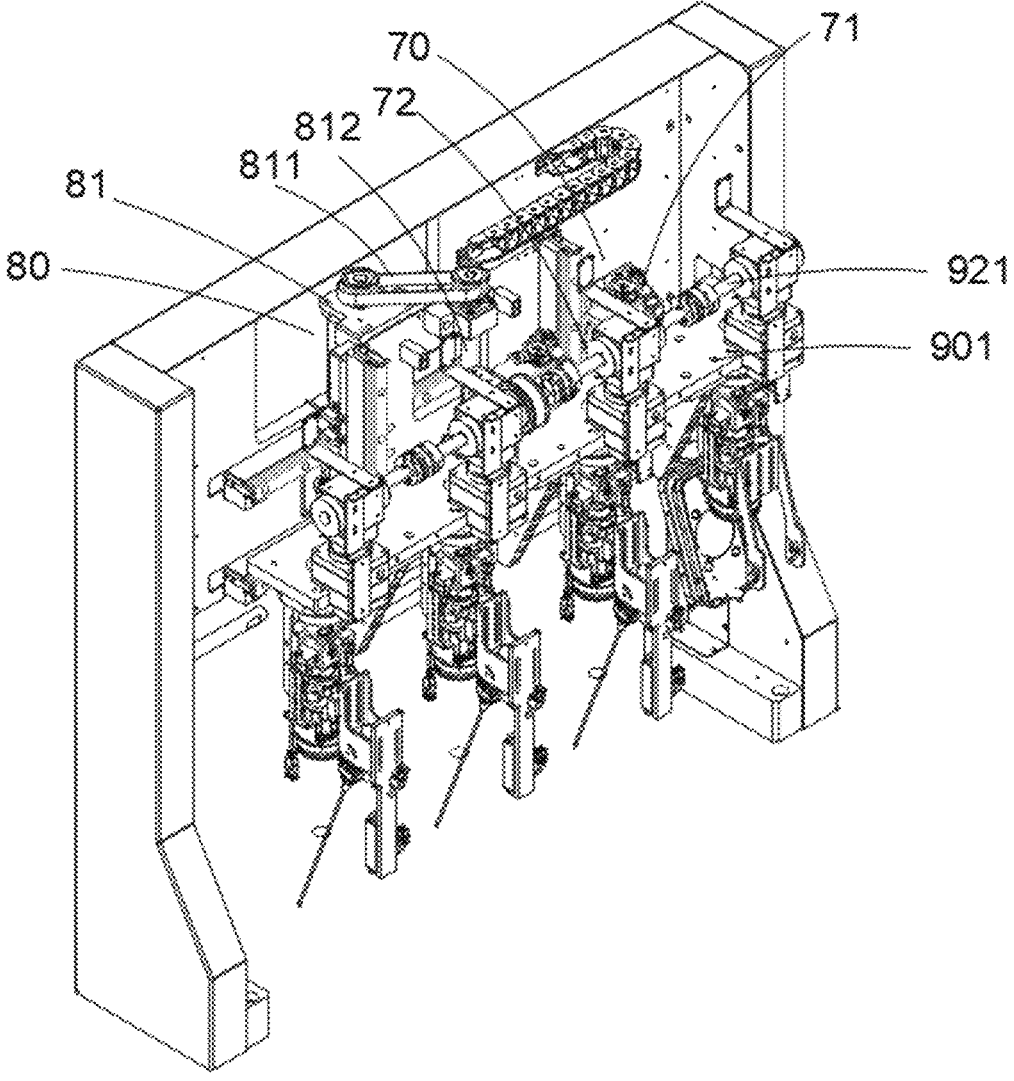
FIG. 2 illustrates a second schematic stereogram of the six-axis agile shooting device in FIG. 1.
Figure 3:
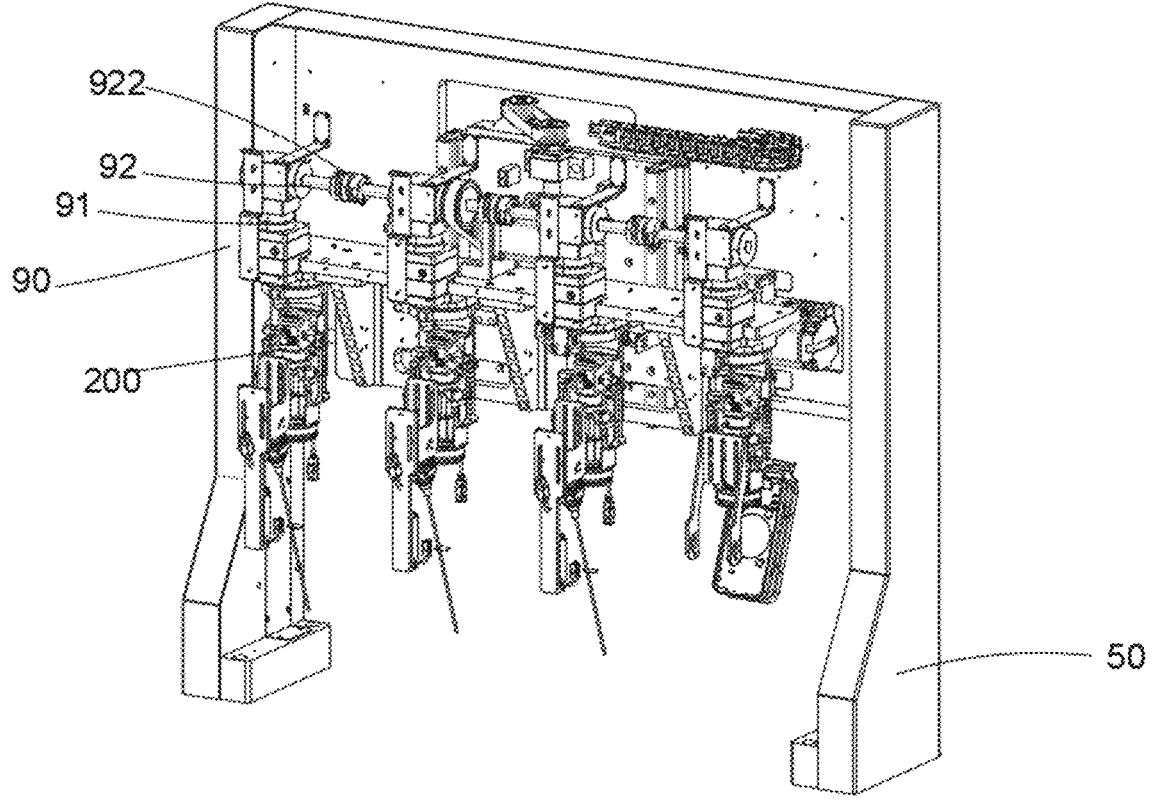
FIG. 3 illustrates a third schematic stereogram of the six-axis agile shooting device in FIG. 1.
Figure 4:
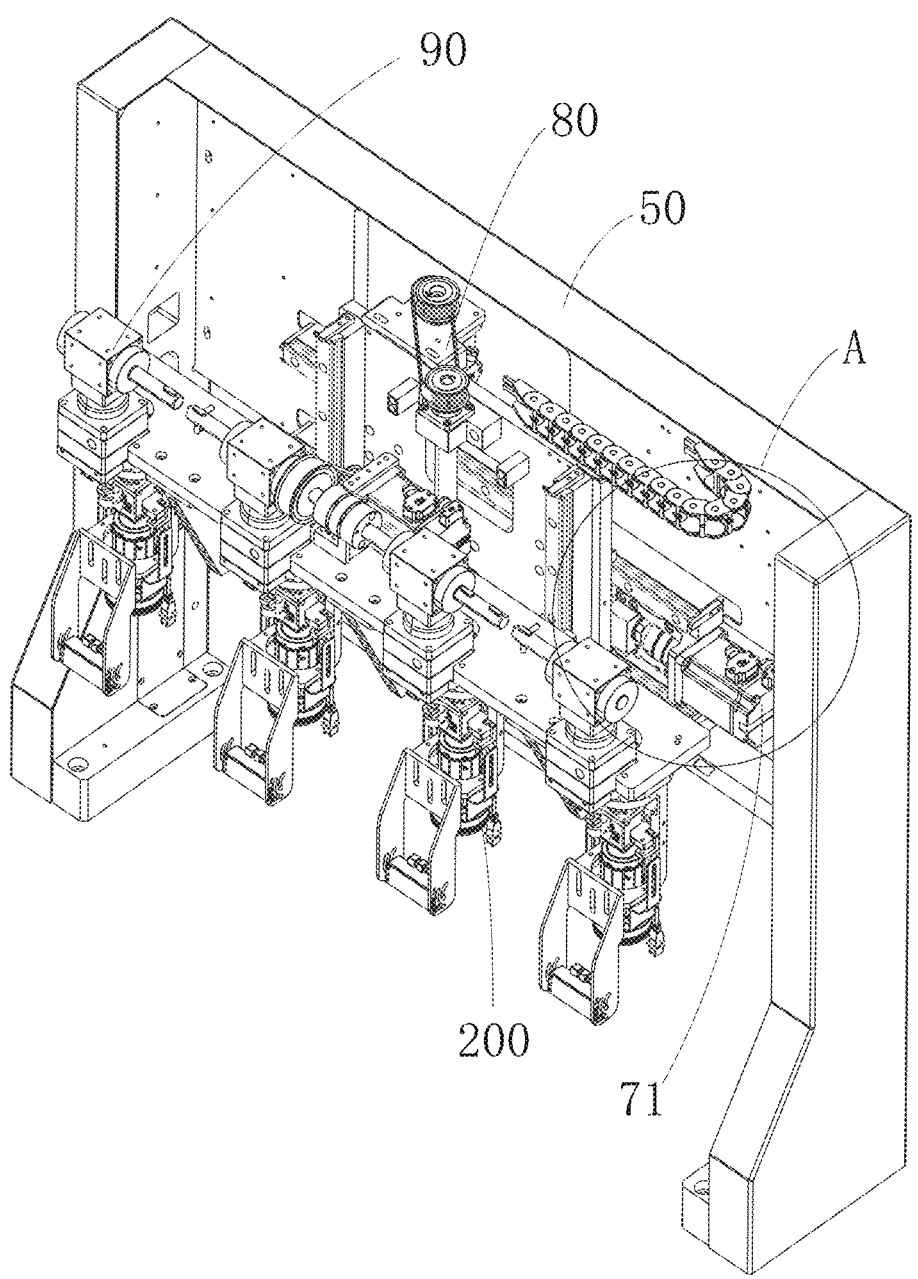
FIG. 4 illustrates a fourth schematic stereogram of the six-axis agile shooting device in FIG. 1.
Figure 5:
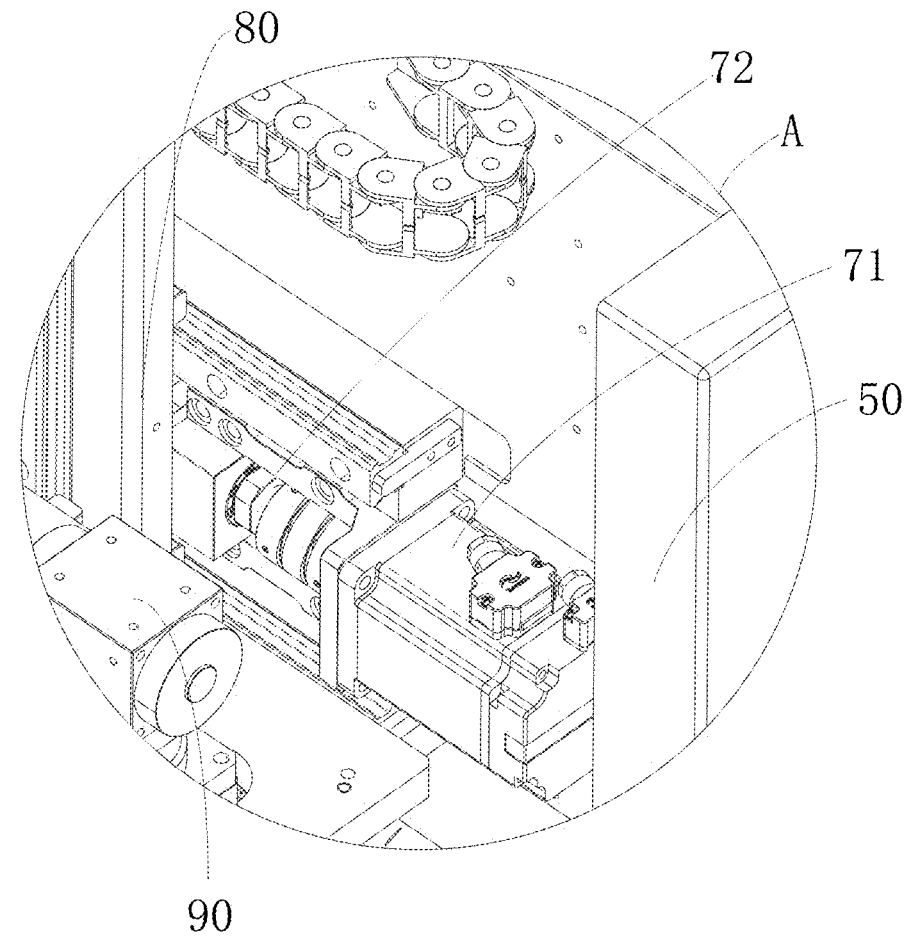
FIG. 5 illustrates an enlarged view of an area A in FIG. 4.
Figure 6:
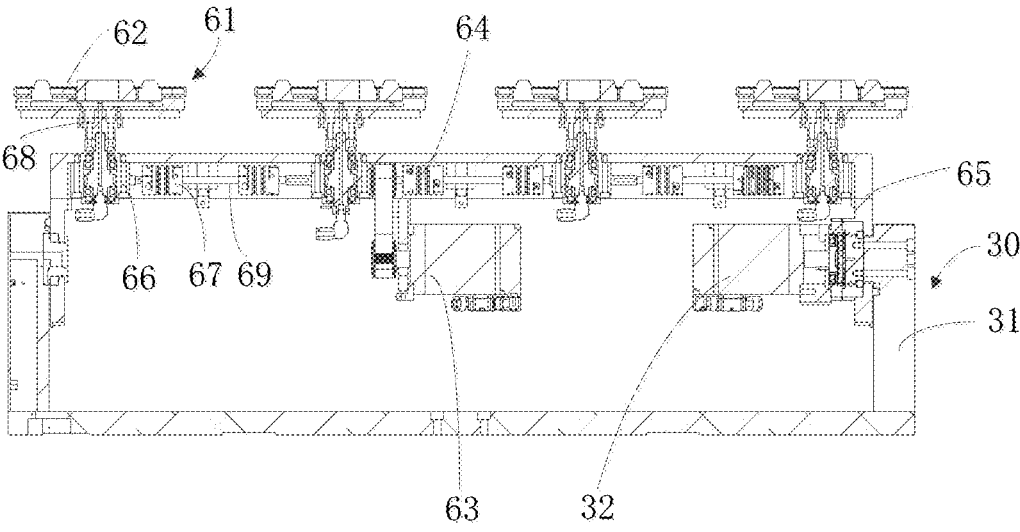
FIG. 6 illustrates a sectional view of a second flipping directional axis motion assembly and a third infinite rotating motion assembly of the six-axis agile shooting device in FIG. 1.

Referring to FIG. 1 to FIG. 6, a six-axis agile shooting device includes a base assembly 10 and multiple shooting assemblies 200.

The six-axis agile shooting device further includes a first linear directional axis motion assembly 20 disposed on the base assembly 10.

The six-axis agile shooting device further includes a second flipping directional axis motion assembly 30, the first linear directional axis motion assembly 20 is configured to drive the second flipping directional axis motion assembly 30 to move forward and backward.

The six-axis agile shooting device further includes a third infinite rotating motion assembly 60, the second flipping directional axis motion assembly 30 is configured to drive the third infinite rotating motion assembly 60 to flip, the third infinite rotating motion assembly 60 includes multiple rotating platform assemblies 61, and each rotating platform assembly 61 is provided with a shooting workstation 62 correspondingly.

The six-axis agile shooting device further includes a gantry 50 and a fourth linear lead screw axis motion assembly 70, the gantry 50 is fixed to the base assembly 10, and fixedly connected to the fourth linear lead screw axis motion assembly 70.

The six-axis agile shooting device further includes a fifth lead screw lifting axis motion assembly 80 fixedly connected to the fourth linear lead screw axis motion assembly 70, the fourth linear lead screw axis motion assembly 70 is configured to drive the fifth lead screw lifting axis motion assembly 80 to move back and forth.

The six-axis agile shooting device further includes a sixth rotating axis motion assembly 90 fixedly connected to the fifth lead screw lifting axis motion assembly 80, the fifth lead screw lifting axis motion assembly 80 is configured to drive the sixth rotating axis motion assembly 90 to move up and down, and the sixth rotating axis motion assembly 90 is fixedly connected to the multiple shooting assemblies 200 and configured to drive the multiple shooting assemblies 200 to flip and shoot.

Six motion assemblies including the first linear directional axis motion assembly 20, the second flipping directional axis motion assembly 30, the third infinite rotating motion assembly 60, the fourth linear lead screw axis motion assembly 70, the fifth lead screw lifting axis motion assembly 80 and the sixth rotating axis motion assembly 90 are used for multiple angle linkage shooting, solving the problems of poor flexibility and lack of mobility In the embodiment, the first linear directional axis motion assembly 20 includes a first driving component 21 and a first lead screw 22, the first driving component 21 is fixedly connected to the first lead screw 22 and configured to drive the first lead screw 22 to rotate, and the first lead screw 22 is threadedly connected to the second flipping directional axis motion assembly 30. The transmission stability of the lead screw is good.

In the embodiment, a lower part of the second flipping directional axis motion assembly 30 is provided with a slide assembly 23 for guidance, the number of the slide assembly 23 may be two, each rotating platform assemblies 61 includes a hollow rotating platform 68 and a 90-degree angle device 66, and the hollow rotating platform 68 is installed on the 90-degree angle device 66, improving drive efficiency.

In the embodiment, the second flipping directional axis motion assembly 30 includes a second bracket 31 and a second driving component 32. The third infinite rotating motion assembly 60 further includes a third bracket 65, a third driving component 63, and a third transmission component 64, and the multiple rotating platform assemblies 61 are rotatably installed on the third bracket 65. The third driving component 63 is in transmission connection with the multiple rotating platform assemblies 61, configured to drive each multiple rotating platform assembly 61 to rotate around its own axis on the third bracket 65.

In the embodiment, adjacent two of the multiple rotating platform assemblies 61 are connected to each other by a coupling 67 and a transmission shaft 69, in order that power of the third driving component 63 can be transmitted to the multiple rotating platform assemblies 61. The fourth linear lead screw axis motion assembly 70 includes a fourth driving component 71 and a connecting rod 72, and the fourth driving component 71 is fixedly connected to the connecting rod 72, and configured to drive the connecting rod 72 to move. The fifth lead screw lifting axis motion assembly 80 includes a fifth driving component 81, a belt pulley 811 and a lift lead screw 812, and the fifth driving component 81 is configured to drive the lift lead screw 812 to rotate by the belt pulley 811, improving flexibility and efficiency.

In the embodiment, the sixth rotating axis motion assembly 90 includes a lifting platform 901, and the lifting platform 901 is slidably installed on the gantry 50, the sixth rotating axis motion assembly 90 further includes a sixth driving component 91 and a connecting shaft assembly 92, and the sixth driving component 91 is configured to drive the connecting shaft assembly 92 to rotate; the connecting shaft assembly 92 includes multiple connecting shafts 921 and couplings 922. The six-axis agile shooting device has new structure, good design and high applicability, and is easy to promote.

In the embodiment, the 90-degree angle device 66 is used to turn rotation of the transmission shaft 69 by 90 degrees, thereby driving the hollow rotating platform 68 to rotate around its own axis. The shooting workstation 62 is disposed on the hollow rotating platform 68, configured to place a shooting object. The second driving component 32 is an electric motor, and the second driving component 32 is connected to the second bracket 31 and the third bracket 65, configured to drive the third infinite rotating motion assembly 60 to swing back and forth relative to the second bracket 31.

During shooting, the shooting object is fixed on the shooting workstation 62. The first linear directional axis motion assembly 20 drives the second flipping directional axis motion assembly 30 to move to a bottom of the multiple shooting assemblies 200. The fourth linear lead screw axis motion assembly 70 drives the fifth lead screw lifting axis motion assembly 80 to move left and right on the gantry 50. The fifth lead screw lifting axis motion assembly 80 drives the sixth rotating axis motion assembly 90 to move up and down. The sixth rotating axis motion assembly 90 drives the multiple shooting assemblies 200 to flip, in order that the multiple shooting assemblies 200 are aimed at the shooting object on the shooting workstation 62. During the shooting process, the second flipping directional axis motion assembly 30 drives the third infinite rotating motion assembly 60 to swing back and forth, the third infinite rotating motion assembly 60 drives the multiple rotating platform assemblies 61 to rotate, in order that the multiple shooting assemblies 200 can capture different surfaces of the shooting object, and the sixth rotating axis motion assembly 90 can also drive the multiple shooting assemblies 200 to rotate according to need of shooting angles.

The embodiment above is only a preferred embodiment of the disclosure, and cannot be used to limit protection scope of the disclosure, any non-substantial change or replacement made by those skilled in the art on a basis of the disclosure belongs to the protection scope of the disclosure.

What is claimed is:

1. A six-axis agile shooting device, comprising:
   a base assembly and a plurality of shooting assemblies;
   a linear directional axis motion assembly, disposed on the base assembly;
   a flipping directional axis motion assembly, wherein the linear directional axis motion assembly is configured to drive the flipping directional axis motion assembly to move forward and backward;
   an infinite rotating motion assembly, wherein the flipping directional axis motion assembly is configured to drive the infinite rotating motion assembly to flip, the infinite rotating motion assembly comprises: a plurality of rotating platform assemblies, and each rotating platform assembly is provided with a shooting workstation correspondingly;
   a gantry and a linear lead screw axis motion assembly, wherein the gantry is fixed to the base assembly, and fixedly connected to the linear lead screw axis motion assembly;
   a lead screw lifting axis motion assembly, fixedly connected to the linear lead screw axis motion assembly, wherein the linear lead screw axis motion assembly is configured to drive the lead screw lifting axis motion assembly to move back and forth; and
   a rotating axis motion assembly, fixedly connected to the lead screw lifting axis motion assembly, wherein the lead screw lifting axis motion assembly is configured to drive the rotating axis motion assembly to move up and down, and the rotating axis motion assembly is fixedly connected to the plurality of shooting assemblies and configured to drive the plurality of shooting assemblies to flip and shoot.

2. The six-axis agile shooting device as claimed in claim 1, wherein the linear directional axis motion assembly comprises: a driving component and a lead screw, the driving component is fixedly connected to the lead screw, and configured to drive the lead screw to rotate, and the lead screw is threadedly connected to the flipping directional axis motion assembly.

3. The six-axis agile shooting device as claimed in claim 2, wherein a lower part of the flipping directional axis motion assembly is provided with a slide assembly for guidance.

4. The six-axis agile shooting device as claimed in claim 1, wherein each rotating platform assembly comprises a hollow rotating platform and a 90-degree angle device, and the hollow rotating platform is installed on the 90-degree angle device.

5. The six-axis agile shooting device as claimed in claim 4, wherein adjacent two of the plurality of rotating platform assemblies are connected to each other by a coupling.

6. The six-axis agile shooting device as claimed in claim 1, wherein the linear lead screw axis motion assembly comprises: a driving component and a connecting rod, and the driving component is fixedly connected to the connecting rod, and configured to drive the connecting rod to move.

7. The six-axis agile shooting device as claimed in claim 1, wherein the lead screw lifting axis motion assembly comprises: a driving component, a belt pulley and a lift lead screw, and the driving component is configured to drive the lift lead screw to rotate by the belt pulley.

8. The six-axis agile shooting device as claimed in claim 1, wherein the rotating axis motion assembly comprises a lifting platform, and the lifting platform is slidably installed on the gantry.

9. The six-axis agile shooting device as claimed in claim 1, wherein the rotating axis motion assembly comprises: a driving component and a connecting shaft assembly, and the driving component is configured to drive the connecting shaft assembly to rotate.

10. The six-axis agile shooting device as claimed in claim 9, wherein the connecting shaft assembly comprises: connecting shafts and couplings.

* * * * *